United States Patent [19]

Mark

[11] Patent Number: 5,947,149
[45] Date of Patent: Sep. 7, 1999

[54] NON-VISIBLE FAUCET HANDLE CONNECTION

[75] Inventor: Darren M. Mark, Valencia, Calif.

[73] Assignee: Emhart Inc., Newark, Del.

[21] Appl. No.: 09/038,949

[22] Filed: Mar. 12, 1998

[51] Int. Cl.[6] .................................................. F16K 31/60
[52] U.S. Cl. .......................................... 137/359; 251/293
[58] Field of Search ................................ 137/359, 382.5; 251/293

[56] References Cited

U.S. PATENT DOCUMENTS

| | | |
|---|---|---|
| 391,445 | 10/1888 | Williams . |
| 1,654,550 | 1/1928 | Muend . |
| 1,662,291 | 3/1928 | Bastian . |
| 1,704,851 | 3/1929 | Zolleis . |
| 3,114,385 | 12/1963 | Kimbro . |
| 3,582,116 | 6/1971 | Young ................................. 251/293 X |
| 3,744,752 | 7/1973 | Massey . |
| 5,257,645 | 11/1993 | Scully et al. ............................. 137/359 |

*Primary Examiner*—John Fox
*Attorney, Agent, or Firm*—Harold Weinstein

[57] ABSTRACT

A handle assembly is connectable to a valve stem of a valve extending from a deck mounting above an escutcheon flange engaging the valve and the deck. The handle assembly includes a handle adapter to which a handle is connected. The handle adapter has a lower section on which a handle hub, bell shaped, is journaled. The handle hub is threadedly connected to the escutcheon flange to operatively connect the handle adapter to the valve stem with no visible connection means showing.

16 Claims, 3 Drawing Sheets

NON-VISIBLE FAUCET HANDLE CONNECTION

BACKGROUND OF THE INVENTION

This invention relates to a handle assembly and, more specifically, it relates to a handle assembly in which there are no visible connection means showing between the handle assembly and the valve.

In the more conventional handle assembly, the connection to the valve is visible which makes it easier to interfere with or otherwise lose parts.

SUMMARY OF THE INVENTION

It is an object of the present invention to provide a non-visible faucet handle connection which is simple in construction, economical to produce and highly reliable in operation.

It is another object of the present invention to provide a non-visible faucet handle connection that, once assembled, will stay connected under normal operating conditions, but may be disassembled without damaging the interconnected components.

It is another object of the present invention to provide a non-visible faucet handle connection that operates smoothly in assembled position.

It is another object of the present invention to assemble the handle and the valve separately and then connect the handle to the valve to couple the assembly with no visible connection means showing.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
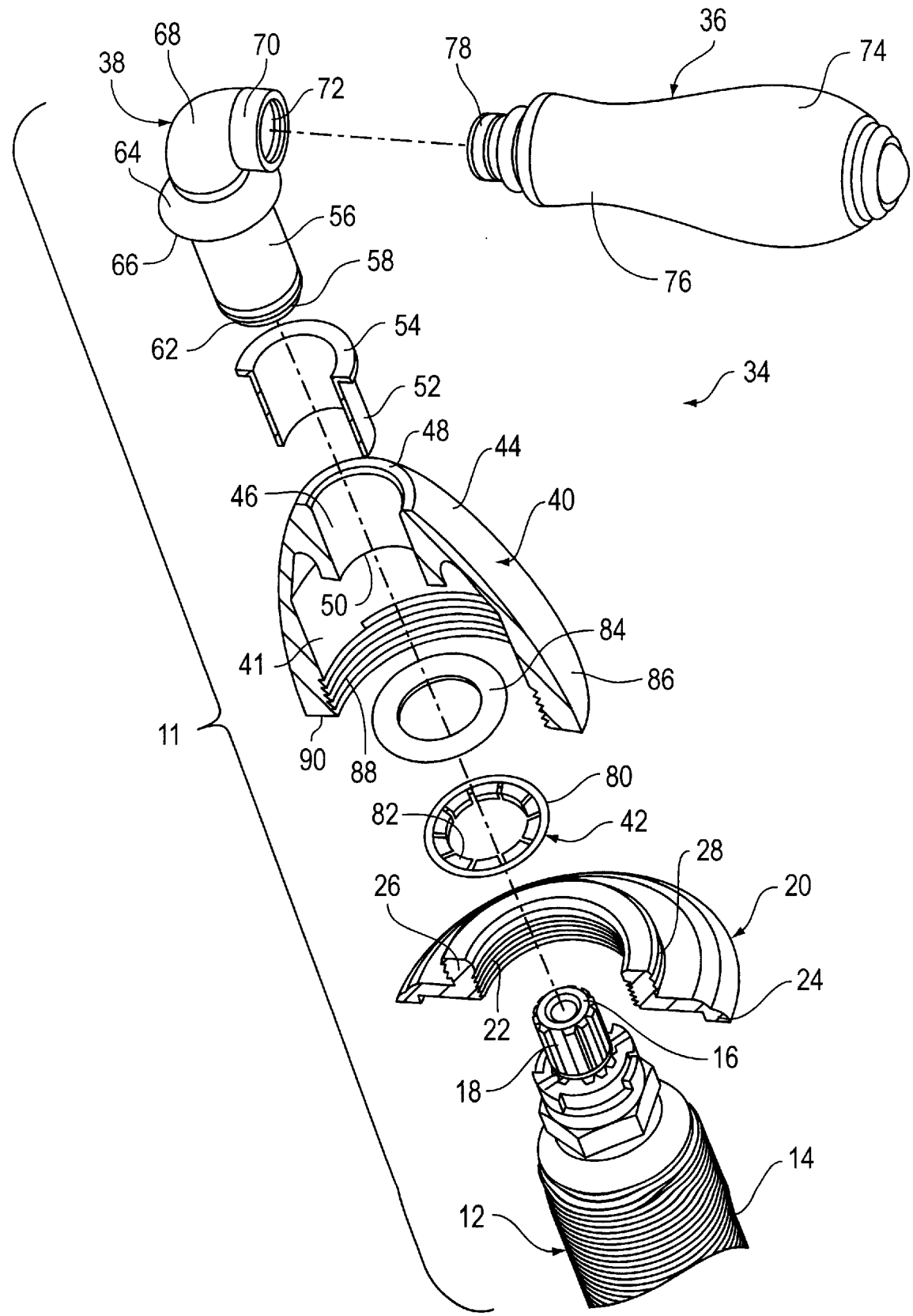
FIG. 1 is an exploded perspective, partly in section, of a preferred embodiment of the handle assembly of the present invention.

Referring to the drawings, a preferred embodiment of the present invention is illustrated in FIGS. 1, 2, 3 and 4 of the drawings wherein a deck 10 is shown through which a faucet plumbing fixture 11 having a faucet valve 12 protruding therefrom. Only the upper part of the valve body 14 of the valve 12 is shown and it is externally threaded. A conventional valve stem 16, best shown in FIG. 1, with its upper end 18 splined protrudes from the top of the valve body 14. An annular escutcheon flange or nut member 20 having a central threaded opening 22 engages the threaded valve body 14. The outer edge 24 turns downwardly and has a flat bottom that seats upon the upper surface of the deck 10. The inner edge 26 of the escutcheon member 20 turns upwardly and is externally threaded at 28. A nut 30 with a washer 32 threadedly engages the threaded valve body 14 on the underside of the deck 10 to secure the valve body 14 to the deck 10.

It will be understood that reference to the orientation of the various components being either horizontal or vertical refers to the orientation illustrated in the drawings, but that, if the faucet were to be installed in a vertical wall or at another orientation, the angle of the mounting would change to correspond to the angle of the mounting of the faucet plumbing fixture 11.

A handle assembly 34, illustrated in FIGS. 1, 2 and 3, includes a lever handle 36, a handle member or handle adapter 38, a handle hub 40, a snap ring 42 and other components described hereinafter is connected independently from the valve 12 connection to the deck 10. The handle hub 40 is bell shaped with an internal open space 41 and an upper section 44 having a central opening 46 that extends therethrough from the top 48 to a bottom 50 of the upper section 44 which is formed above the open space 41. A sleeve bearing 52 having a short outwardly extending annular flange 54 to sit on the top 48 is disposed in the opening 46 to terminate a short distance from the bottom 50 of the upper section 44. The handle member 38 has a handle portion 56 journaled in the opening 46 by the bearing 52. The hub portion 56 has a splined open bottom 58 which is sized to fit the splined upper end 18 of the valve stem 16 for purposes to be described more fully hereinafter. The hub portion 56 extends below the bottom 50 of the upper section 44 wherein an annular recess 60 is formed to extend radially inwardly from the smooth outer surface a short distance below the bottom 50 of the upper section 44. A taper 62 is formed on the bottom section of the hub portion 56 to extend from below the recess 60 to the bottom 58 of the hub portion 56 with the taper extending downwardly and inwardly at a small angle. A cap 64 is formed above the hub portion 56. The cap 64 has a bottom sized with substantially the same diameter as the diameter of the top 48 of the upper section 44 of the hub portion 56. The bottom 66 of the cap 64 nests upon the annular flange 54 of the sleeve bearing 52. The cap 64 tapers upwardly and inwardly with the same gentle arcuate curve as that of the outer surface of the bell shaped handle hub 40. The handle member 38 has an elbow 68 formed above the cap 64 to turn it from the vertically disposed hub portion 56 to a horizontal direction of arm 70, the outer end of which is a threaded opening 72. The generally horizontally disposed lever handle 36 has a capped bulbous end 74 which is gently curved to a smaller diameter at the other end and necked down near the connection end 76 which has a threaded projection 78 shown best in FIG. 1 that is threadedly connected within the threaded opening 72.

The snap ring 42, shown best in FIG. 1, has a rigid flat outer ring 80 formed with a diameter slightly smaller than the diameter of the bottom 50 of the upper section 44 and is sized to nest thereunder, as explained more fully hereinafter. The diameter of the outer ring 80 is slightly larger than the diameter of the hub portion 56 of the handle member 38 for purposes more fully explained hereinafter. A plurality of inwardly extending tangs 82 are circumferentially spaced from each other and formed at a slight downward direction. The distance between the inner end of adjacent tangs 82 is a little larger than the largest diameter of the tapered section 62 of the hub portion 56 and, also, just slightly larger than the diameter measured across the recess 60 of the hub portion 56. A thrust washer 84 is sized the same as the bottom 50 of the upper section 44 and, as explained hereinafter, will be sandwiched between the bottom 50 of the upper section 44 and the snap ring 42.

Figure 4:
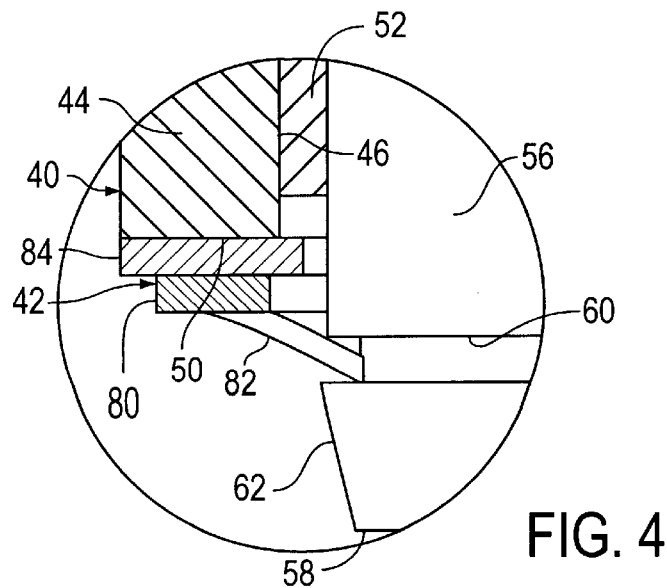
FIG. 4 is an enlarged view of the encircled portion of FIG. 3 showing the details of the connection of the handle member and the hub via the snap ring.

The handle assembly 34 can conveniently be made before interconnecting the handle assembly 34 to the valve 12. This is done by connecting the lever handle 36 to the handle member 38 with the threaded connection of threaded member 78 into the threaded opening 72. Alternatively, the handle 36 could have been connected at any convenient time during or after the assembly of the faucet 11. Then the sleeve bearing 52 is disposed through the top of the opening 46 of the upper section 44, followed by the hub portion 56, being disposed in the sleeve bearing 52. The flange 54 of bearing 52 rests on the top 48 of the upper section 44, while the cap 64 sits on the flange 54. The recess 60 of the hub portion 56 extends below the bottom 50 of the upper section 44 and the thrust washer will be passed upwardly over the recess 60 of the hub portion 56 to engage the bottom 50 of the upper section 44. Together with, or thereafter, the snap ring 42 is raised upwardly onto the hub portion 56 by the tangs 82, acting like spring fingers, yieldably engaging the tapered section 62 of the hub portion 56 to bend radially outwardly until the ends of the tangs 82 of the snap ring 42 snap into the recess 60 of the hub portion 56, as best shown in FIG. 4. With the tangs 82 of the snap ring 42 firmly mounted in the recess 60 of the hub portion 56, the ring 80 thereof engages and urges the thrust washer 84 into contact with the bottom 50 of the upper section 44. Upon connection of the snap ring 42 to the hub portion 56, the handle assembly 34 is complete and the handle member 38 and the handle hub 40 are journaled to each other to permit relative rotation of one to the other.

The handle hub 40 will be placed over the escutcheon member 20 with the splined opening 58 of the hub portion 56 engaging the top of the splined valve stem 16. The lower section 86 of the handle hub has an internal threaded section 88 that threadedly engages the upturned threaded portion 28 of the escutcheon member 20. The threaded connection between threaded section 88 of the lower section 86 and the threaded portion 28 of the member 20 is completed when the bottom 90 of the handle hub 40 engages the upper surface of the escutcheon flange 20. The hub portion 56 was moved vertically downwardly in a non-rotative manner as the handle member 38 is journaled to the handle hub 40 which was free to turn without turning the handle member 38.

Figure 3:
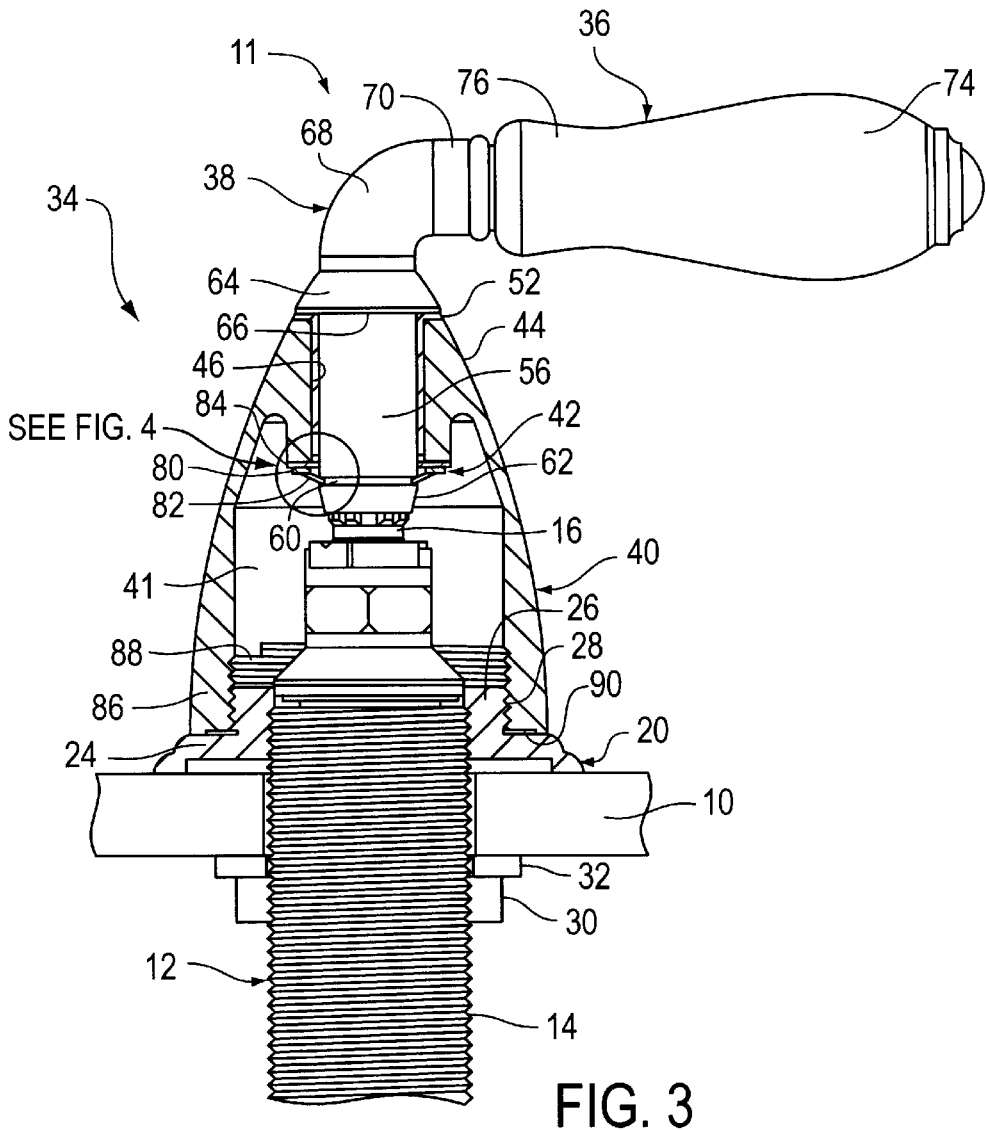
FIG. 3 is an elevational view, partly in section, of the preferred embodiment of the handle assembly of the present invention shown in FIG. 2.

The assembled position shown in FIG. 3 illustrates that the handle assembly 34 has been connected to the valve 12 in a non-visible manner by the use of internal and non-visible connection means.

Figure 2:
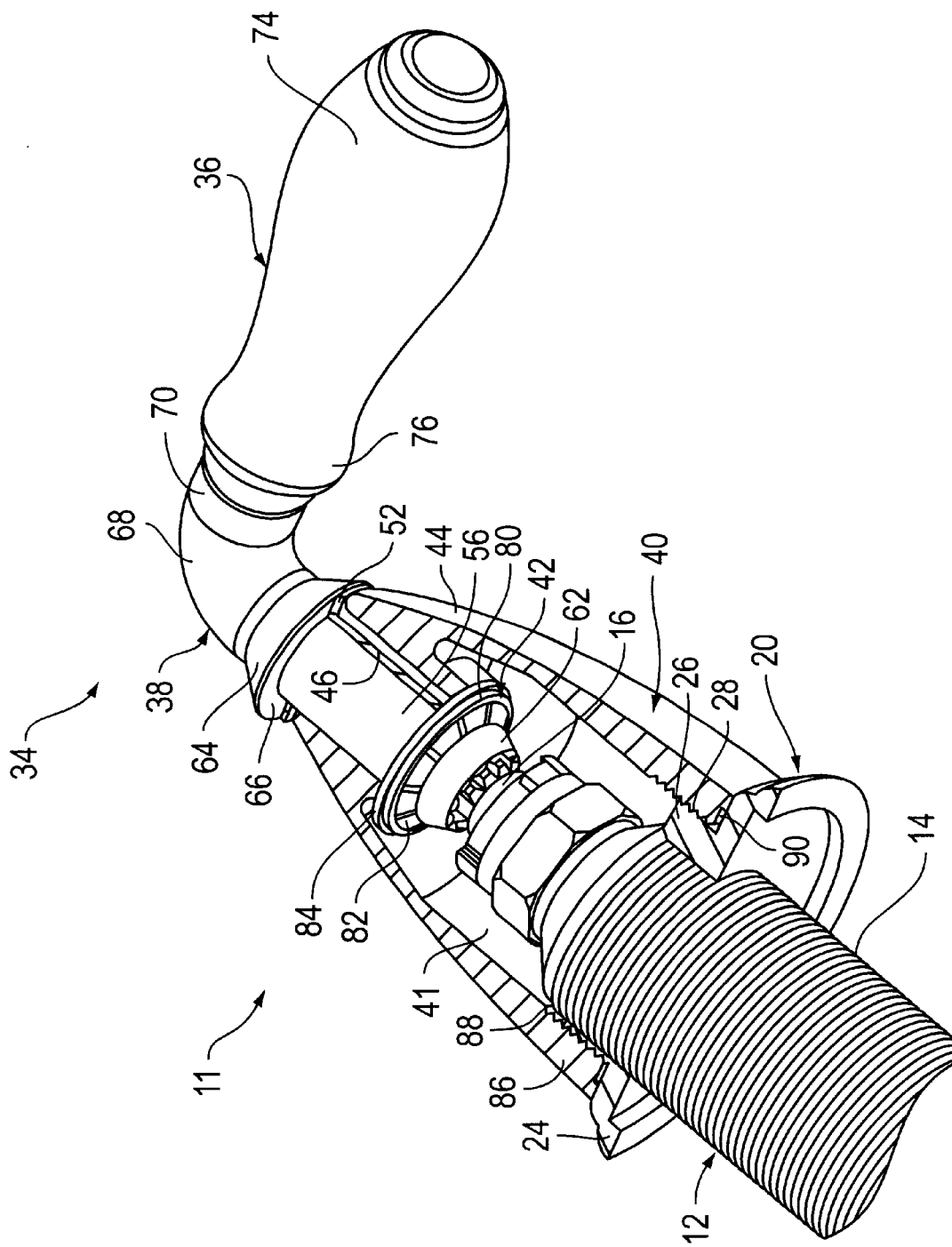
FIG. 2 is an assembled perspective, partly in section, of the preferred embodiment of the handle assembly of the present invention shown in FIG. 1.

It will be understood that, while a specific handle member 38 and handle hub 40 have been described and illustrated in FIGS. 1, 2 and 3, the construction of the invention renders disassembly easy and, also, the interchange of the components with other decorative components are readily accomplished with the handle hub 40 unscrewed from its connection to the threaded section 28 and the snap ring 42 disengaged from the recess 60. Whether the components shown or replacements components are used, assembly will be substantially as described and illustrated hereinbefore.

While a preferred embodiment has been described above, it will be readily apparent to those skilled in the art that many modifications, substitutions and alternatives may be made without departing from the spirit and scope of the invention. Therefore, it is intended that the scope of the invention should not be limited by the description of the preferred embodiment, but only by the claims which follow.

What is claimed is:

1. A handle assembly connectable to a valve stem of a valve extending from a deck above an escutcheon flange engaging the valve and the deck, comprising:

a. a handle member having an upper section and a lower section;
    b. a handle connected to the upper section of the handle member;
    c. a handle hub journaled on the lower section of the handle member; and
    d. the handle hub is connected to the escutcheon flange to operatively attach the handle member to the valve stem with no visible connection means showing.

2. The combination claimed in claim 1 wherein:

a. the lower section of the handle member having a reduced cross-sectional area;
    b. a hole formed in the handle hub to fit upon the lower section of the handle member; and
    c. a fastener member interconnecting the handle member and the handle hub.

3. The combination claimed in claim 2 wherein:

a. an annular recess formed in the lower section of the handle member; and
    b. the fastener member defining a snap ring engaged in the recess to journal the handle hub to the handle member.

4. The combination claimed in claim 3 wherein:

a. a sleeve bearing is disposed between the handle member and the handle hub to journal the contact therebetween.

5. The combination claimed in claim 1 wherein:

a. the handle member operatively connectable to the valve stem for concurrent rotation therewith;
    b. the handle member having a cylindrical lower section;
    c. a recess formed in the lower section of the handle member;
    d. the handle hub is bell shaped with a hole therein to receive the lower section of the handle member and has a threaded lower portion therein;
    e. a snap ring disposed in the recess and engaging handle hub below the hole thereof;
    f. a sleeve bearing disposed on the lower section of the handle member and in the hole of the handle hub to journal the handle hub on the handle member; and
    g. the escutcheon flange connected to mount the valve on the deck and threadedly engaged by the lower portion of the handle hub to complete the handle assembly with no visible connection means.

6. The combination claimed in claim 5 wherein:

a. the recess is annular;
    b. the wall below the annular recess is tapered inwardly; and
    c. the snap ring is formed with a plurality of tabs passing over the tapered wall before being engaged in the recess.

7. The combination claimed in claim 6 wherein:

a. the valve has a threaded body extending above the deck; and
    b. the escutcheon flange has an annular vertical portion threaded on both sides thereof with the inside connected to mount the valve body to the deck and the outside non-visibly connected to the lower section of the handle hub.

8. A handle assembly for a valve having a valve stem, comprising:

a. a handle member having an upper section and a lower section of reduced diameter;
    b. the lower section of the handle member having an annular recess adjacent its bottom;

c. a handle connected to the upper section of the handle member;

d. a handle hub disposed on the lower section of the handle member;

e. a sleeve bearing journaling the handle hub to the handle member above the annular recess;

f. a snap ring affixed in the annular recess to rotatively mount the handle hub and the handle member;

g. an escutcheon flange connected to mount the valve to the deck;

h. the escutcheon flange has a threaded upper section; and i. the handle hub has a threaded lower section connected to the threaded upper section of the escutcheon flange to connect the handle member to the valve stem for concurrent rotational movement of the handle member and the valve stem.

9. A handle assembly for a valve mounted to a deck by an escutcheon flange, comprising:

a. a handle hub, bell shaped, with an internally threaded open bottom and a hole formed in the top;

b. a sleeve bearing disposed in the hole;

c. a handle member having a lower section disposed in the sleeve bearing and an upper section;

d. a handle connected to the upper section of the handle member;

e. an annular recess formed on the lower section below the sleeve bearing;

f. a snap ring connected in the annular recess to rotatively mount the handle hub on the handle member; and g. the handle hub threadedly connected to the escutcheon flange to non-visibly connect the handle assembly to the valve.

10. A handle assembly connectable to a valve stem of a valve connectably disposed in a deck comprising:

a. a handle hub engaging the deck adjacent the valve's connection to the deck;

b. a handle member affixed to the valve stem;

c. the handle member extending through the upper section of the handle hub;

d. a handle connected to the handle member above the handle hub;

e. bearing means journaling the handle member and the handle hub to permit relative rotation between the handle hub and the handle member;

f. an annular recess formed on the handle member below the bottom of the upper section of the handle hub; and g. a snap ring engaging the bottom of the upper section of the handle hub and disposed in the recess of the handle member to clamp the handle member to the upper section of the handle hub and prevent the handle member from being vertically removed from the handle hub.

11. The combination claimed in claim 10 wherein:

a. the handle hub including an interconnected bell shaped hub and an escutcheon member engaging the deck.

12. A handle assembly comprising:

a. a handle member having a lower tapered portion and an annular recess thereabove;

b. a handle hub having an upper opening formed in its upper section for journaling the handle member thereto above the annular recess thereof;

c. a snap ring slidably disposed upwardly upon the tapered portion of the handle member to be clamped in the recess thereof and to rotatively connect the handle member and the handle hub;

d. the handle hub having a threaded internal portion formed on its lower section; and e. the valve protruding through the deck to be threadedly engaged with the threaded internal portion of the handle hub to form a non-visible connection of the handle assembly to the valve.

13. The combination claimed in claim 12 wherein:

a. the handle hub including an interconnected bell shaped hub and an escutcheon member engaging the deck.

14. A handle assembly including a handle non-visibly connected to a valve mounted on a deck, the valve having a splined valve stem protruding from a threaded valve body clamped to the deck by an upper and a lower threaded nut member, the handle assembly comprising:

a. a bell shaped handle hub having an upper section and a lower section;

b. the upper section of the hub having a central opening therein;

c. the lower section connectable to the upper threaded nut member;

d. a handle member having a hub portion journaled in the opening of the upper section of the hub to permit relative rotative movement of the handle member and the hub;

e. the hub portion having an upwardly tapered bottom section to extend below the upper section of the hub;

f. an annular recess formed on the hub portion of the handle member above the tapered bottom section thereof and below the upper section of the hub;

g. a snap ring member yieldably passing over the tapered bottom section of the hub portion of the handle member to be mounted in the recess thereof to interlock the handle member and the hub; and h. the bottom of the hub section having a splined opening non-removably connectable with the splined valve stem upon the lower section of the hub being connected to the upper threaded nut member.

15. The combination claimed in claim 14 wherein:

a. the bell shaped handle hub having an upper section and a lower section;

b. the upper section of the hub having a central opening therein.

16. The combination claimed in claim 14 wherein:

a. the snap ring having a plurality of inwardly radially extending tangs circumferentially spaced from each other about the snap ring; and b. the tangs to deflect during engagement with the tapered bottom of the hub portion of the handle member and to snap into mounted position within the recess of the hub portion upon assembly of the handle member to the hub.

* * * * *